US010414354B2

(12) United States Patent
Noguchi et al.

(10) Patent No.: US 10,414,354 B2
(45) Date of Patent: Sep. 17, 2019

(54) WIRING GROMMET AND VEHICULAR HARNESS USING THE SAME

(71) Applicant: Stanley Electric Co., Ltd., Tokyo (JP)

(72) Inventors: Takahiro Noguchi, Tokyo (JP); Daisuke Nagafuchi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/943,247

(22) Filed: Apr. 2, 2018

(65) Prior Publication Data
US 2018/0304832 A1    Oct. 25, 2018

(30) Foreign Application Priority Data

Apr. 20, 2017   (JP) ................. 2017-083985

(51) Int. Cl.
| | | |
|---|---|---|
| *B60R 16/02* | (2006.01) | |
| *H02G 3/22* | (2006.01) | |
| *H01B 17/58* | (2006.01) | |
| *F16L 5/02* | (2006.01) | |
| *B60Q 1/00* | (2006.01) | |
| *B60Q 1/26* | (2006.01) | |
| *F16L 5/10* | (2006.01) | |

(52) U.S. Cl.
CPC ........ *B60R 16/0222* (2013.01); *B60Q 1/0088* (2013.01); *B60Q 1/2607* (2013.01); *F16L 5/02* (2013.01); *H01B 17/583* (2013.01); *H02G 3/22* (2013.01); *B60Q 1/2603* (2013.01); *F16L 5/10* (2013.01)

(58) Field of Classification Search
CPC ......... B60R 16/0222; F16L 5/02; H02G 3/22; H01B 17/583

USPC ..................................... 174/152 G
See application file for complete search history.

(56) References Cited

U.S. PATENT DOCUMENTS

| | | | | |
|---|---|---|---|---|
| 6,297,457 B1 * | 10/2001 | Yamada | ............. | B60R 16/0222 16/2.1 |
| 8,314,337 B2 * | 11/2012 | Fujita | ............. | B60R 16/0222 16/2.1 |
| 8,860,047 B2 | 10/2014 | Morimoto | | |

FOREIGN PATENT DOCUMENTS

| | | |
|---|---|---|
| JP | 10-213272 A | 8/1998 |
| JP | 2015-60679 A | 3/2015 |
| JP | 2015-193287 A | 11/2015 |

* cited by examiner

*Primary Examiner* — Dhiru R Patel
(74) *Attorney, Agent, or Firm* — Kenealy Vaidya LLP

(57) ABSTRACT

A vehicular harness using a wiring grommet having a broad utility and a high reliability can include a plurality of through-holes. The wiring grommet can include each of a first minimum thickness, a second minimum thickness, and a third minimum thickness, which can be thicker than a first threshold, a second threshold and a third threshold, respectively, and can also include a first side thickness, which can be thinner than a fourth threshold. The vehicular harness can include various wires, which can be contacted with each of inner convex surfaces having a diameter of 95 percent to 60 percent of inside diameters of the though-holes in an appressed state. Thus, the disclosed subject matter can include providing the vehicular harnesses using the wiring grommet, which can be used for vehicle lamps such as a rear lamp and the like, even when the wiring grommet is exposed to an external air.

12 Claims, 7 Drawing Sheets

WIRING GROMMET AND VEHICULAR HARNESS USING THE SAME

This application claims the priority benefit under 35 U.S.C. § 119 of Japanese Patent Application No. 2017-083985 filed on Apr. 20, 2017, which is hereby incorporated in its entirety by reference.

BACKGROUND

1. Field

The presently disclosed subject matter relates to wiring grommets and vehicular harnesses using the wiring grommet, and more particularly to wiring grommets having a broad utility, a high reliability and a waterproof property, even when the wiring grommets are limited to external sides thereof. Thus, the vehicular harnesses using the wiring grommet can be used for vehicle lamps such as a stop lamp, a tail lamp and the like, even when the wiring grommet is exposed to an external air.

2. Description of the Related Art

In various vehicles such as a passenger car, a truck and the like, a battery is generally incorporated in each of engine rooms of the vehicles to provide a power supply to electrical parts such as vehicle lamps, a radio, a navigator etc. Each of the electrical parts is electrically connected to the battery by using a vehicular harness. When the vehicular harness extends from the engine room toward spaces between a body of the vehicle and a vehicle interior of the vehicle, various wiring grommets are used to protect the vehicle harness.

For example, conventional vehicular harnesses integrating a wiring grommet are disclosed in Patent Document No. 1 (Japanese Patent Application Laid Open No. H10-213,272), which is owned by Applicant of this disclosed subject matter. FIGS. 7a and 7c are cross-sectional views showing a first conventional vehicular harness integrating a first wiring grommet and a second conventional vehicular harness integrating a second wiring grommet, respectively, which is disclosed in Patent Document No. 1. FIG. 7b is a perspective view showing a separator 5 used to temporary-fix each of the third wire 2a, the fourth wire 2b, the fifth wire 3a and the sixth wire 3b to the separator 5 in the first conventional vehicular harness of FIG. 7a.

The second conventional vehicular harness 90, which passes through a wall 80 located between an engine room of a vehicle and a vehicle interior of the vehicle, discloses: a second grommet 93 made from a rubber; a first wire 91 connecting a positive electrode of a battery incorporated in the engine room; a second wire 92 connecting a negative electrode of the battery and passing through the second grommet 93; and a third wire 91a and a fourth wire 91b being branched from the first wire 91 via a connecting member P in the second grommet 93 and extending along the second wire 92.

In the second conventional vehicular harness 90, when a fifth wire and a sixth wire are branched from the second wire 92 via another connecting member in the second grommet 93, the other connecting member may come near the connecting member P. Hence, it may be difficult for the second conventional vehicular harness 90 integrating the second grommet 93 to branch each two wires from the first wire 91 and the second wire 92 in the second grommet 93 when integrally casting the vehicular harness 90 in the second grommet 93. Patent Document No. 1 discloses the first conventional vehicular harness 1 integrating the first wiring grommet 4 to overcome the above-described problem as shown in FIGS. 7a and 7b.

The first conventional vehicular harness 1 may branch a third wire 2a and a fourth wire 2b from a first wire 2 via a first connecting member P1 in the first grommet 4 and also may branch a fifth wire 3a and a sixth wire 3b from a second wire 3 via a second connecting member P2 in the first grommet 4 by using a separator 5 having a fixing portion 51. Specifically, the first conventional vehicular harness 1 may maintain a distance between the first connecting member P1 and the second connecting member P2 by temporary-fixing each of the third wire 2a, the fourth wire 2b, the fifth wire 3a and the sixth wire 3b to the fixing portion 51 of the separator 5, and may be manufactured by integrally casing the separator 5 temporary-fixing each of the third wire 2a, the fourth wire 2b, the fifth wire 3a and the sixth wire 3b in the first wiring grommet 4. Each of the third wire 2a, the fourth wire 2b, the fifth wire 3a and the sixth wire 3b may connected to a 4P-coupler 6.

In the first conventional vehicular harness 1, because each of the third wire 2a, the fourth wire 2b, the fifth wire 3a and the sixth wire 3b aligns along the fixing portion 51 of the separator 5, when the first wiring grommet 4 are limited to external sides thereof, the distance between the first connecting member P1 and the second connecting member P2 may become close. Additionally, each of spaces between the adjacent wires of the third wire 2a, the fourth wire 2b, the fifth wire 3a and the sixth wire 3b also should come near with respect to each other.

Accordingly, a structure of the first conventional vehicular harness 1 may degrade a reliability of the wiring grommet 4 when the wiring grommet 4 is limited to external sides thereof. Additionally, when each of the spaces between the adjacent wires of the third wire 2a, the fourth wire 2b, the fifth wire 3a and the sixth wire 3b comes near with respect to each other, the wiring grommet 4 may crack in each of the spaces between the adjacent wires of the third wire 2a, the fourth wire 2b, the fifth wire 3a and the sixth wire 3b.

Therefore, the structure of the first conventional vehicular harness 1 may degrade the reliability such as a waterproof property and the like due to degradations of the wiring grommet 4 when the wiring grommet 4 are limited to the external sides thereof. Moreover, the conventional structure need to manufacture the first conventional vehicular harness 1 by integrally casting each of the four wires along with the separator 5 into the wiring grommet 4, and therefore the first conventional vehicular harness 1 may not necessarily have a broad utility.

The above-referenced Patent Documents and additional Patent Documents are listed below and are hereby incorporated with their English specifications and abstracts in their entireties.

1. Patent Document No. 1: Japanese Patent Application Laid Open No. H10-213,272
2. Patent Document No. 2: Japanese Patent Application Laid Open No. 2015-193,287
3. Patent Document No. 3: U.S. Pat. No. 8,860,047
4. Patent Document No. 4: Japanese Patent Application Laid Open No. 2015-060,679

The disclosed subject matter has been devised to consider the above and other problems, characteristics and features. Thus, exemplary embodiments of the disclosed subject matter can include wiring grommets having a broad utility and a high reliability with respect to a waterproof property and the like, even when the wiring grommets are limited to the external sides thereof, and also can include the wiring grommets, which is not only simple to be attached to a wall located between an engine room of a vehicle and a vehicle interior of the vehicle but also is easy to be attached vehicle lamps such as a rear lamp, etc. Accordingly, the exemplary embodiments of the disclosed subject matter can include vehicular harnesses using the wiring grommet can be used for the vehicle lamps such as a stop lamp, a tail lamp and the like, even when the wiring grommet is exposed to an external air.

SUMMARY

The presently disclosed subject matter has been devised in view of the above and other characteristics, desires, and problems in the conventional art. An aspect of the disclosed subject matter can include the wiring grommets having a broad utility and a high reliability, even when the wiring grommets are limited to external sides thereof. Another aspect of the disclosed subject matter can include providing vehicular harnesses using the wiring grommet can be used for vehicle lamps such as a stop lamp, a tail lamp and the like, even when the wiring grommet is exposed to an external air.

According to an aspect of the disclosed subject matter, a wiring grommet made from a rubber having a hardness of A40 to A60 in Japanese Industrial Standards K6253 (JIS K6253) can include: a top surface having a first top surface and a second top surface, the first top surface formed in a substantially planar shape, the second top surface formed in a substantially planar shape, and located in substantially parallel with the first top surface; a first side surface located between the first top surface and the second top surface; a rear surface formed in a substantially planar shape, and located in an opposite direction of the top surface; and at least two outer convex surface located between the second top surface and the rear surface, formed in a substantially ring shape, and located in substantially parallel with the second top surface, and a second side thickness thereof being is thicker than a first side thickness of the first side surface.

In addition, the wiring grommet can also include a plurality of through-holes passing between the first top surface and the rear surface, each of the through-holes formed in a substantially circle at a center thereof, each of inner surfaces thereof having a plurality of inner concave surfaces formed in a substantially ring shape at the center, each of the inner concave surfaces narrowed from the inner surface toward the center, and each of convex top diameters of the inner concave surfaces formed in a substantially circle at the center, wherein a first minimum thickness in intervals between the adjacent through-holes of the through-holes is thicker than a first threshold, a second minimum thickness in second thicknesses between each of outer edges of the through-holes and the first top outer edge of the first top surface is thicker than a second threshold, a third minimum thickness in third thicknesses between second top outer edges and second top inner edges of the second top surface is thicker than a third threshold, and a first side thickness of the first side surface is thinner than a fourth threshold.

In the above-described exemplary wiring grommets, the top surface can be only one surface by forming the first side thickness at zero. When each of inside diameters of the through-holes is substantially 2.2 millimeters, each of the convex top diameters of the through-holes can be 95 percent to 60 percent of said 2.2 millimeters, and the first threshold can be 0.6-millimeters or more, and also the second threshold can be 2.0 millimeters or more, the third threshold can be 2.6 millimeters or more, and the fourth threshold can also be 2.0 millimeters or less. Additionally, the grommets can further include a wiring protector projecting from the rear surface in an opposite direction of the top surface and extending at least one of the plurality of through-holes. The plurality of through-holes can be configured to include four through-holes of a first through-hole, a second through-hole, a third through-hole and a fourth through-hole. In this case, each of the centers of the first through-hole and the second through-hole can be arranged on a first imaginary line, and each of the centers of the third through-hole and the fourth through-hole can be arranged on a second imaginary line, which is located in substantially parallel with the first imaginary line, and also a third imaginary line intersecting with the second center of the second through-hole, which is located adjacent the third through-hole and intersects with the first imaginary at a right angle, can cross the second imaginary line at a right angle in a direction toward the first through-hole out of range between the third outer edge of the third through-hole and the fourth outer edge of the fourth through-hole.

According to the above-described exemplary wiring grommets, various wires can be easy to be inserted into each of the though-holes due to each of the inner convex surfaces having a vanishing shape, and also can be contacted with each of the inner convex surfaces having a diameter of 95 percent to 60 percent of the inside diameters of the though-holes in an appressed state. Additionally, the first minimum thickness can be thicker than a first threshold, the second minimum thickness can be thicker than the second threshold, the third minimum thickness can be thicker than the third threshold, and the first side thickness can be thinner than the fourth threshold. Therefore, the wiring grommets can have a broad utility and a high reliability with respect to a waterproof property, a mechanical strength and the like, even when the wiring grommets are limited to external sides thereof.

According to another aspect of the disclosed subject matter, an exemplary vehicular harnesses using the wiring grommet can include either wire code AV0.5 having outside diameter of standard 2.2 millimeters or wire code AV0.5f having outside diameter of standard 2.2 millimeters in Japanese Industrial Standards C3406 (JIS C3406) inserted into each of the plurality of through-holes.

According to the exemplary vehicular harnesses using the wiring grommet, the vehicular harness can use the wiring grommet having a broad utility and a high reliability described above. The wiring grommets can include the at least two outer convex surface located between the second top surface and the rear surface and formed in a substantially ring shape, and therefore cannot only be easy to be attached to a wall located between an engine room of a vehicle and a vehicle interior of the vehicle but also can be easy to be attached to vehicle lamps such as a rear lamp, etc. Thus, the disclosed subject matter can provide vehicular harnesses can be used for vehicle lamps such as a stop lamp, a tail lamp and the like, even when the wiring grommet is exposed to an external air.

BRIEF DESCRIPTION OF THE DRAWINGS

These and other characteristics and features of the disclosed subject matter will become clear from the following description with reference to the accompanying drawings, wherein:

FIG. 2a is a front view showing the wiring grommet shown in FIG. 1a, FIG. 2b is an enlarged partial cross-sectional view taken along Line A-A shown in FIG. 2a, and FIG. 2c is an enlarged partial front view showing a part of through-holes of the wiring grommet shown in FIG. 1a;

FIG. 3d is a schematic circuit diagram when the rear combination lamp including a rear lamp and a stop lamp is used for the truck shown in FIG. 3a;

DETAILED DESCRIPTION OF EXEMPLARY EMBODIMENTS

Figure 1A:
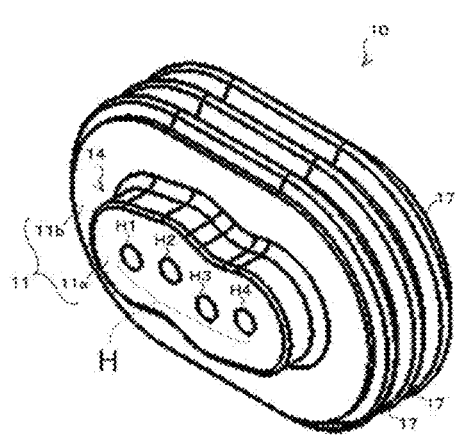
FIG. 1a is a perspective view showing an exemplary embodiment of a wiring grommet made in accordance with principles of the disclosed subject matter.
Figure 1B:
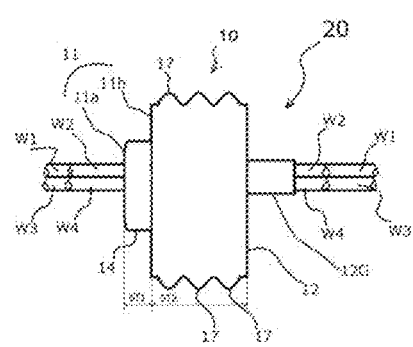
FIG. 1b is a side cross-sectional view showing an exemplary embodiment of a vehicular harness using the wiring grommet made in accordance with principles of the disclosed subject matter.

The disclosed subject matter will now be described in detail with reference to FIG. 1a to FIG. 6, in which the same, similar, or corresponding elements use the same reference marks. FIG. 1a is a perspective view showing an exemplary embodiment of a wiring grommet made in accordance with principles of the disclosed subject matter, and FIG. 1b is a side cross-sectional view showing an exemplary embodiment of a vehicular harness using the wiring grommet made in accordance with principles of the disclosed subject matter. The wiring grommet can be made from a rubber such as an ethylene rubber, a propylene rubber, an ethylene-propylene rubber, an acrylonitrile-butadiene rubber, etc.

The wiring grommet 10 can be made from the rubber, of which a hardness is A40 to A60 in Japanese Industrial Standards K6253 (JIS K6253). The rubber having the hardness of A40 to A60 has been used for various wiring grommets in general. Vehicular wires W, for exemplary, wire code AV0.5 having outside diameter of standard 2.2 millimeters, wire code AV0.5f having outside diameter of standard 2.2 millimeters, wire code AV0.75f having outside diameter of standard 2.4 millimeters and wire code AV0.85 having outside diameter of standard 2.4 millimeters in JIS C3406, and wire code AVSS0.5 having outside diameter of standard 1.6 millimeters, wire code AVSS0.85 having outside diameter of standard 1.8 millimeters and wire code AVSS1.25 having outside diameter of standard 2.1 millimeters in Japanese Automotive Standards D611 (JASO D611) and the like can be used as a wire for the vehicular harness 20.

The wiring grommet 10 can include: a top surface 11 having a first top surface 11a and a second top surface 11b, the first top surface 11a formed in a substantially planar shape, the second top surface 11b also formed in a substantially planar shape and located in parallel with the first top surface 11a; a first side surface 14 located between the first top surface 11a and the second top surface 11b of the top surface 11; a rear surface 12 formed in a substantially planar shape, located in an opposite direction of the top surface 11 and located in substantially parallel with the second top surface 11b; and at least two outer convex surface 17 located between the second top surface 11b of the top surface 11 and the rear surface 12, formed in a substantially ring shape, and located in substantially parallel with the second top surface 11b.

In this case, a second side thickness ST2 of the at least two outer convex surface 17 located between the second top surface 11b of the top surface 11 and the rear surface 12 can be thicker than a first side thickness ST1 of the first side surface 14, which is located between the first top surface 11a and the second top surface 11b of the top surface 11. The wiring grommet 10 can also include a through-hole H passing between the first top surface 11a of the top surface 11 and the rear surface 12, and the through-hole H having a plurality of through-holes, for example, H1, H2, H3 and H4, which has the first side thickness ST1 and the second side thickness ST2.

As shown in FIG. 1b, the vehicular harness 20 using the wiring grommet 10 can include a first wire W1 passing through a first through-hole H1, a second wire W2 passing through a second through-hole H2, a third wire W3 passing through a third through-hole H3 and a fourth wire W4 passing through a fourth through-hole H4. Each of the wires W1, W2, W3 and W4 can be appropriately connected between a positive/negative electrode of a battery and electrical parts such as vehicle lamps, a windshield wiper, a navigator, etc. Thereby, the vehicular harness 20 using the wiring grommet 10 can enable each of the electrical parts to operate for a driver.

In this case, the vehicular harness 20 can also include a wiring protector 12G, which projects from the rear surface 12 in an opposite direction of the top surface 11 and surrounds at least one of the wires W1, W2, W3 and W4, to protect the at least one of the wires W1, W2, W3 and W4 from swinging of the wires. As the at least one of the wires W1, W2, W3 and W4, wire code AV0.5 having outside diameter of standard 2.2 millimeters, wire code AV0.5f having outside diameter of standard 2.2 millimeters, wire code AV0.75f having outside diameter of standard 2.4 millimeters and wire code AV0.85 having outside diameter of standard 2.4 millimeters in JIS C3406, and wire code AVSS0.5 having outside diameter of standard 1.6 millimeters, wire code AVSS0.85 having outside diameter of standard 1.8 millimeters and wire code AVSS1.25 having outside diameter of standard 2.1 millimeters in JASO D611 and the like can be used.

Figure 2A:
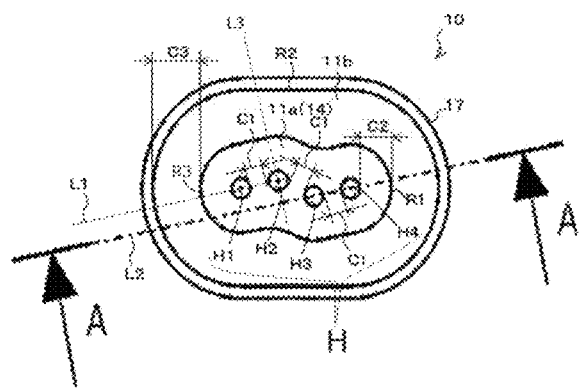
Figure 2B:
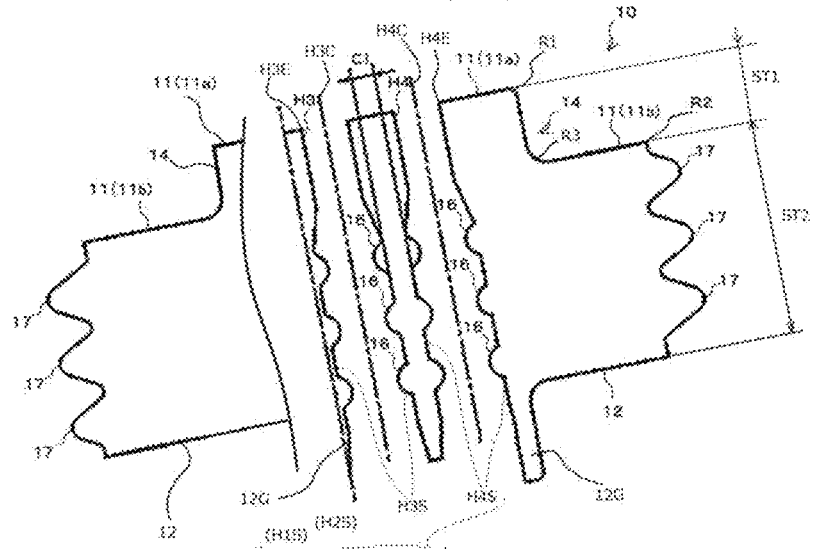
Figure 2C:
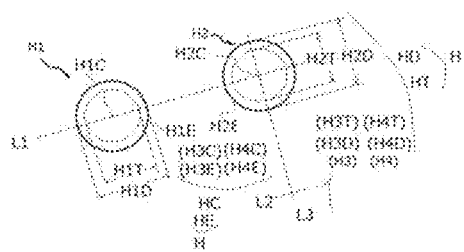

Next, a structure of the through-hole H including the plurality of through-holes H1, H2, H3 and H4 will now be described with reference to FIGS. 2a, 2b and 2c, in which FIG. 2a is a front view showing the wiring grommet 10 shown in FIG. 1a, FIG. 2b is an enlarged partial cross-sectional view taken along Line A-A shown in FIG. 2a, and FIG. 2c is an enlarged partial front view showing a part of through-holes of the wiring grommet 10 shown in FIG. 1a.

The through-hole H including the plurality of through-holes H1, H2, H3 and H4 can include an inner surface HS having an inside diameter HD and an outer edge HE formed in a substantially circle at a center HC, more specifically, for example, a first inner surface H1S having an first inside diameter H1D and a first outer edge H1E formed in a substantially circle at a first center H1C of the first through-hole H1, a second inner surface H2S having a second inside diameter H2D and a second outer edge H2E formed in a substantially circle at a center H2C of the second through-hole H2, a third inner surface H3S having a third inside diameter H3D and a third outer edge H3E formed in a substantially circle at a third center H3C of the third through-hole H3, and a fourth inner surface H4S having a fourth inside diameter H4D and a fourth outer edge H4E formed in a substantially circle at a fourth center H4C of the fourth through-hole H4.

Each of the plurality of through-holes H1, H2, H3 and H4 of the through-hole H can include a plurality of inner convex surfaces 16, for example, three inner convex surfaces as shown in FIG. 2b, and each of the inner convex surfaces 16 of the through-hole H can be formed in a substantially ring shape at the first center H1C of a circle, a substantially ring shape at the second center H2C of the circle, a substantially ring shape at the third center H3C of the circle and a substantially ring shape at the fourth center H4C of the circle, respectively.

In addition, each of the inner convex surfaces 16 of the through-hole H can have a first convex top diameter H1T formed in a substantially circle at the first center H1C of the first through-hole H1, a second convex top diameter H2T formed in a substantially circle at the second center H2C of the second through-hole H2, a third convex top diameter H3T formed in a substantially circle at the third center H3C of the third through-hole H3 and a forth convex top diameter H4T formed in a substantially circle at the fourth center H4C of the first through-hole H4 of the convex top diameter HT formed in a substantially circle at the center HC of the through-hole H. Each of the inner convex surfaces 16 of the through-hole H can be formed so as to narrow from the inner surface HS toward the center HC of the through-hole H.

Each of the first inside diameter H1D of the first through-hole H1, the second inside diameter H2D of the second through-hole H2, the third inside diameter H3D of the third through-hole H3 and the fourth inside diameter H4D of the fourth through-hole H4 can be substantially the same as a respective one of outside diameters of the wires W1, W2, W3 and W4. For example, when wire code AV0.5 having outside diameter of standard 2.2 millimeters or wire code AV0.5f having outside diameter of standard 2.2 millimeters in JIS C3406 is used as a respective one of the wires W1, W2, W3 and W4, each of the first inside diameter H1D of the first through-hole H1, the second inside diameter H2D of the second through-hole H2, the third inside diameter H3D of the third through-hole H3 and the fourth inside diameter H4D of the fourth through-hole H4 can be substantially 2.2 millimeters.

Moreover, each of the first convex top diameter H1T of the first through-hole H1, the second convex top diameter H2T of the second through-hole H2, the third convex top diameter H3T of the third through-hole H3 and the forth convex top diameter H4T of the first through-hole H4 as the convex top diameter HT of the through-hole H can be 95 percent to 60 percent of a respective one of the first inside diameter H1D of the first through-hole H1, the second inside diameter H2D of the second through-hole H2, the third inside diameter H3D of the third through-hole H3 and the fourth inside diameter H4D of the fourth through-hole H4, respectively.

For example, when wire code AV0.5 having outside diameter of standard 2.2 millimeters or wire code AV0.5f having outside diameter of standard 2.2 millimeters in JIS C3406 is used as the respective one of the wires W1, W2, W3 and W4, each of the first convex top diameter H1T of the first through-hole H1, the second convex top diameter H2T of the second through-hole H2, the third convex top diameter H3T of the third through-hole H3 and the forth convex top diameter H4T of the first through-hole H4 as the convex top diameter HT of the through-hole H can be substantially 2.0 millimeters. Thereby, each of the inner convex surfaces 16 can contact with the first wire W1 in the first through-hole H1, the second wire W2 in the second through-hole H2, the third wire W3 in the third through-hole H3 and the fourth wire W4 in the fourth through-hole H4 in an appressed state, respectively.

In addition, the at least two outer convex surface 17, which are located between the second top surface 11b of the top surface 11 and the rear surface 12 and are formed in the substantially ring shape, can contact with each of attaching surfaces of the electrical parts in an appressed state as described later. Each of the first wire W1 in the first through-hole H1, the second wire W2 in the second through-hole H2, the third wire W3 in the third through-hole H3 and the fourth wire W4 in the fourth through-hole H4 can be cut in accordance with a necessary length after inserting it into a respective one of the through-holes or before inserting it into the respective one of the through-holes, because the vehicular harness 20 need not to be integrated into the wiring grommet 10. The vehicular harness 20 can also use a plurality of the wiring grommets 10 as appropriate.

Accordingly, the vehicular harness 20 including the wiring grommet 10 can enable to the wiring grommet 10 to improve a utility and a reliability with respect to a waterproof property, etc. Each of the plurality of through-holes H1, H2, H3 and H4 can be arranged in a substantially N-shaped fashion as shown in FIG. 2a. Specifically, each of the first center H1C of the first through-hole H1 and the second center H2C of the second through-hole H2 can be arranged on a first imaginary line L1, and each of the third center H3C of the third through-hole H3 and the fourth center H4C of the fourth through-hole H4 can be arranged on a second imaginary line L2, which is located in substantially parallel with the first imaginary line L1.

Figure 7A:
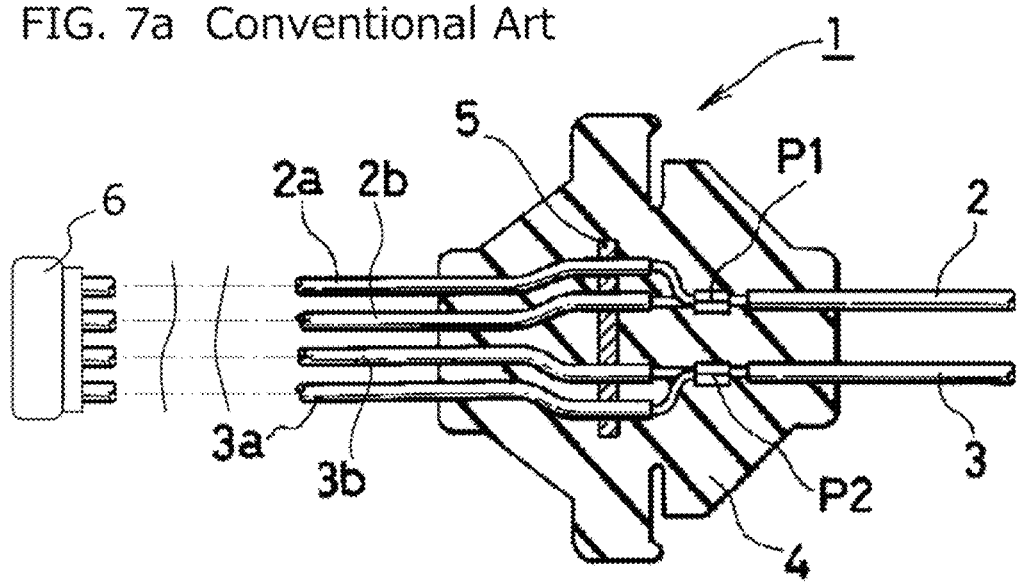
FIG. 7a is a cross-sectional view showing a first conventional vehicular harness integrating a first conventional wiring grommet.
Figure 7B:
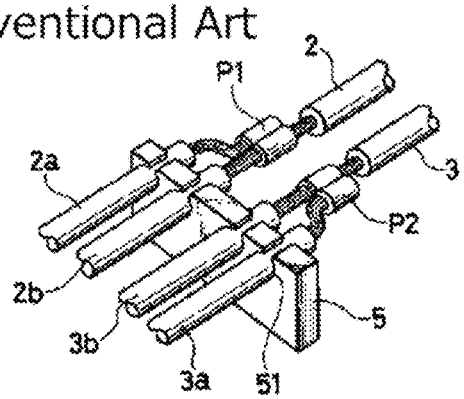
FIG. 7b is a perspective view showing a separator used to temporary-fix each of four wires to the separator in the first conventional vehicular harness of FIG. 7a, and FIG. 7c is a cross-sectional view showing a second conventional vehicular harness integrating a second wiring grommet.

In addition, a third imaginary line L3 intersecting with the second center H2C of the second through-hole H2, which is located adjacent the third through-hole H3 and intersects with the first imaginary L1 at a right angle, can cross the second imaginary line L2 at a right angle in a direction toward the first through-hole H1 out of range between the third outer edge H3E of the third through-hole H3 and the fourth outer edge H4E of the fourth through-hole H4 as shown in FIG. 2a. Thereby, each of the first wire W1, the second wire W2, the third wire W3 and the fourth wire W4 can align in turn while it eliminates overlap with respect to each other, and therefore can be easy to be connected to the 4P-coupler 6, in which four wires align as shown in FIG. 7a, and also can prevent a faulty wiring.

In order to improve a mechanical strength of the wiring grommet 10, each of intervals between the adjacent through-holes of the through-holes H1, H2, H3 and H4 can be maintained in thicker intervals than a first minimum thickness C1, which is thicker than a first threshold TH1 to prevent each of cracks caused between the adjacent through-holes of the through-holes H1, H2, H3 and H4. Thereby, the vehicular harness 20 can also improve the waterproof property between the first wire W1 and the first through-hole H1, the second wire W2 and the second through-hole H2, the third wire W3 and the third through-hole H3 and the fourth wire W4 and the fourth through-hole H4 of the wring grommet 10.

When wire code AV0.5 having outside diameter of standard 2.2 millimeters or wire code AV0.5f having outside diameter of standard 2.2 millimeters in JIS C3406 is used as the respective one of the wires W1, W2, W3 and W4, that is, when each of the first inside diameter H1D, the second inside diameter H2D, the third inside diameter H3D and the fourth inside diameter H4D is substantially 2.2 millimeters, the first threshold TH1 can be 0.6 millimeters or more. When each of the first inside diameter H1D, the second inside diameter H2D, the third inside diameter H3D and the fourth inside diameter H4D is more than 2.2 millimeters, the first threshold TH1 can be more than 0.6 millimeters. Conversely, when each of intervals between the adjacent through-holes of the through-holes H1, H2, H3 and H4 is less than the first threshold TH1, the wiring grommet 10 may not prevent each of cracks caused between the adjacent through-holes of the through-holes H1, H2, H3 and H4.

Therefore, the disclosed subject matter can provide the wiring grommet 10 having a broad utility and a high reliability such that may prevent each of cracks caused between the adjacent through-holes of the through-holes H1, H2, H3 and H4 by maintaining the first minimum thickness C1 at the first threshold TH1 of 0.6 millimeters or more in the structure, in which each of the plurality of through-holes H1, H2, H3 and H4 is arranged in the substantially N-shaped fashion as shown in FIG. 2a.

Moreover, second thicknesses between each of the first, second, third and fourth outer edges H1E, H2E, H3E and H4E of the through-holes H1, H2, H3 and H4 and a first top outer edge R1 of the first top surface 11a can be maintained in thicker spaces than a second minimum thickness C2, which is thicker than a second threshold TH2 to maintain the mechanical strength of the wiring grommet 10 between each of the through-holes H1, H2, H3 and H4 and the first side surface 14 in a direction of the first side thickness ST1 of the first side surface 14, which is located between the first top surface 11a and the second top surface 11b of the top surface 11.

When wire code AV0.5 having outside diameter of standard 2.2 millimeters or wire code AV0.5f having outside diameter of standard 2.2 millimeters in JIS C3406 is used as the respective one of the wires W1, W2, W3 and W4, that is, when each of the first inside diameter H1D, the second inside diameter H2D, the third inside diameter H3D and the fourth inside diameter H4D is substantially 2.2 millimeters, the second threshold TH2 can be 2.0 millimeters or more. Thereby, the vehicular harness 20 can improve the mechanical strength so as to be able to prevent each of the cracks caused between each of the through-holes H1, H2, H3 and H4 and the first side surface 14 in a direction of the first side thickness ST1 of the first side surface 14. Accordingly, the vehicular harness 20 can enable the wiring grommet 10 to prevent each of the cracks caused between each of the through-holes H1, H2, H3 and H4 and the first side surface 14 even when each of the first wire W1, the second wire W2, the third wire W3 and the fourth wire W4 intensively rocks.

Furthermore, third thicknesses between a second top outer edge R2 and a second top inner edge R3 of the second top surface 11b can be maintained in thicker thicknesses than a third minimum thickness C3, which is thicker than a third threshold TH3 to maintain the mechanical strength of the wiring grommet 10 between each of the through-holes H1, H2, H3 and H4 and the at least two outer convex surface 17, which is located between the second top surface 11b of the top surface 11 and the rear surface 12.

When wire code AV0.5 having outside diameter of standard 2.2 millimeters or wire code AV0.5f having outside diameter of standard 2.2 millimeters in JIS C3406 is used as the respective one of the wires W1, W2, W3 and W4, that is, when each of the first inside diameter H1D, the second inside diameter H2D, the third inside diameter H3D and the fourth inside diameter H4D is substantially 2.2 millimeters, the third threshold TH3 can be 2.6 millimeters or more. Thereby, the vehicular harness 20 can improve the mechanical strength so as to be able to prevent each of cracks caused between each of the through-holes H1, H2, H3 and H4 and the at least two outer convex surface 17 in a direction of the first side thickness of the first side surface 14.

In these cases, the first side thickness ST1 can be 0 to 2.0 millimeters to maintain the mechanical strength of the wring grommet 10 by a fourth threshold TH4. When the first side thickness ST1 is 0 millimeter, the first top surface 11a and the second top surface of the top surface 11 can be substantially the same surface. Accordingly, the vehicular harness 20 can enable the wiring grommet 10 to prevent each of cracks caused between each of the through-holes H1, H2, H3 and H4 and the at least two outer convex surface 17 even when each of the first wire W1, the second wire W2, the third wire W3 and the fourth wire W4 is strongly pressured in a direction of the at least two outer convex surface 17 while the wiring grommet 10 is attached to each of the electrical parts in the appressed state.

As described above, the disclosed subject matter can provide the wiring grommet 10 having a broad utility and a high reliability with respect to the waterproof property, the mechanical strength and the like, even when the wiring grommet 10 is limited to external sides thereof. Thus, the vehicular harness 20 using the wiring grommet 10 having a broad utility and a high reliability can be used for the electrical parts such as the vehicle lamps, even when the wiring grommet is exposed to an external air.

Figure 3A:
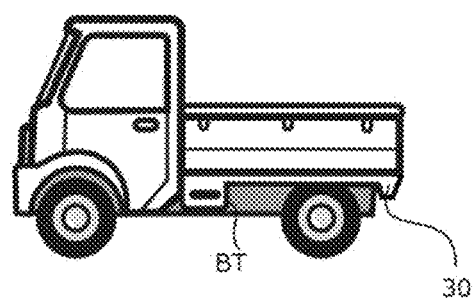
FIG. 3a is an explanatory view for explaining an exemplary embodiment of a rear combination lamp attached to a truck.

Next, exemplary embodiments of mounting the vehicular harness 20 using the wiring grommet 10 will now be described with reference to FIG. 3a to FIG. 4d. Trucks are desired to expand a pallet, and therefore may prefer a vehicular signal lamp such as a rear combination lamp 30 such that may be attached to an exterior portion thereof as shown in FIG. 3a. The rear combination lamp 30 can be used for the trucks, motorcycles, and the like, and is disclosed in Patent Document No. 2 (Japanese Patent Application Laid Open No. 2015-193,287) owned by this Applicant. Accordingly, only an essential point of the rear combination lamp 30 including a rear lamp and a stop lamp will now be described with reference to FIG. 3b The rear combination lamp 30 including a rear lamp and a stop lamp can include: an outer lens 26 made from a transparent resin; a casing 25 having an opening 25A attaching the outer lens 26, the opening 25A attaching the wiring grommet 10 included in the vehicular harness 20; a lamp room 28 located between the casing 25 and the outer lens 26; a rear lamp board 23 including a light-emitting device 21R; a stop lamp board 24 including a light-emitting device 21S; a light guide 22; and wherein light LR emitted from the light-emitting device 21R is used for the rear lamp via the light guide 22, and therefore the rear lamp emits the light LR in accordance with a shape of the light guide 22, and light LR emitted from the light-emitting device 21S is used for the stop lamp.

Figure 3C:
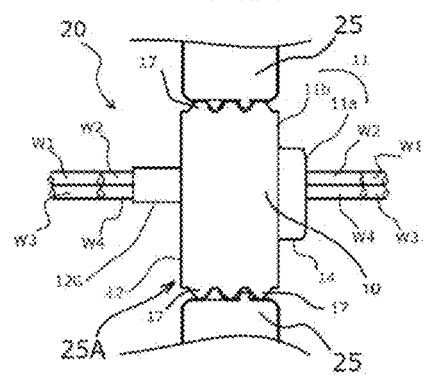
Figure 3B:
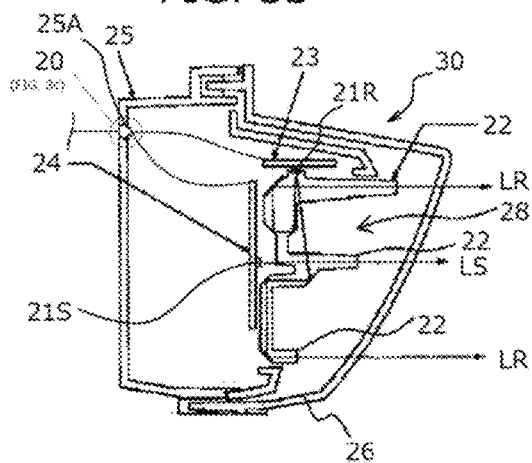
FIG. 3b is a schematic cross-sectional view showing the embodiment of the rear combination lamp shown in FIG. 3a, FIG. 3c is a cross-sectional view showing an exemplary embodiment of mounting the vehicular harness including the wiring grommet in the rear combination lamp of FIG. 3b.

FIG. 3c is a cross-sectional view showing an exemplary embodiment of the vehicular harness 20 including the wiring grommet 10 attached to the opening 25A of the casing 25 in the rear combination lamp 30 including the rear lamp and the stop lamp. The vehicular harness 20 including the wiring grommet 10 can be attached to the opening 25A of the casing 25 in the rear combination lamp 30 by inserting at least one convex portion projected from the opening 25A of the casing 25 into at least one of concave portion, which is formed between the adjacent outer convex surfaces 17 of the at least two outer convex surface 17, while the at least two outer convex surface 17 is tightly contracted by an inner surface of the opening 25A.

Figure 3D:
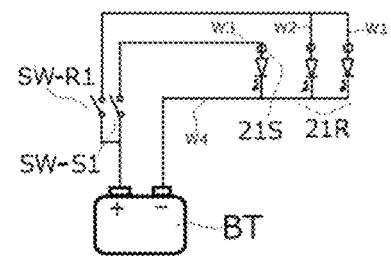

FIG. 3d is a schematic circuit diagram when the rear combination lamp 30 including the rear lamp and the stop lamp is used for the truck shown FIG. 3a. Each of the light-emitting device 21R for the rear lamp and the light-emitting device 21S for the stop lamp can include at least one semiconductor light-emitting device and a resistance to control a current flowing the at least one semiconductor light-emitting device. As the semiconductor light-emitting device, for example, a light-emitting device, which is disclosed in Patent Document No. 3 owned by this Applicant, can be used.

The light-emitting device 21R for the rear lamp can be connected between a positive electrode and a negative electrode of a battery BT via a rear lamp switch SW-R1, and the light-emitting device 21S for the stop lamp can also be connected between the positive electrode and the negative electrode of the battery BT via a stop lamp switch SW-S1. Accordingly, when a driver turns on the rear lamp switch SW-R1, the rear combination lamp 30 can emit the light LR emitted from the light-emitting device 21R as the rear lamp via the light guide 22. Similarly, when the driver turns on the stop lamp switch SW-S1, the rear combination lamp 30 can emit the light LR emitted from the light-emitting device 21S as the stop lamp.

In the truck described above, the battery is frequently incorporated under the pallet of the truck to reduce an engine room of the truck. In this case, a plurality of the wiring grommets 10 can be attached to the vehicular harness 20 to connect the harness 20 from the battery BT to the switches SW-R1 and SW-S1 and to connect the harness 20 from each of the switches SW-R1 and SW-S1 to a respective one of the light-emitting device 21R for the rear lamp and the light-emitting device 21S for the stop lamp of the rear combination lamp 30. An exemplary embodiment of mounting the vehicular harness 20 using the plurality of the wiring grommets 10 will now be described.

Figure 4A:
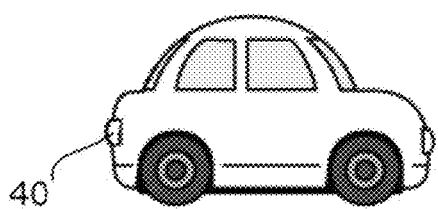
FIG. 4a is an explanatory view for explaining another exemplary embodiment of a rear combination lamp attached to a passenger vehicle.
Figure 4B:
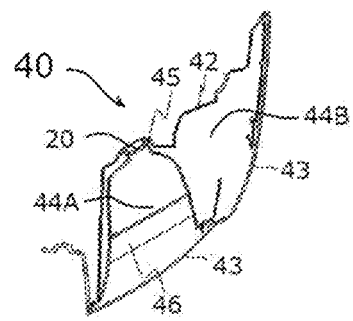
FIG. 4b is a schematic cross-sectional view showing the other embodiment of the rear combination lamp, which is attached to a rear right of a passenger vehicle as shown in FIG. 4a, and FIG. 4c is a schematic cross-sectional view showing an exemplary embodiment of mounting the vehicular harness including a plurality of wiring grommets.
Figure 4C:
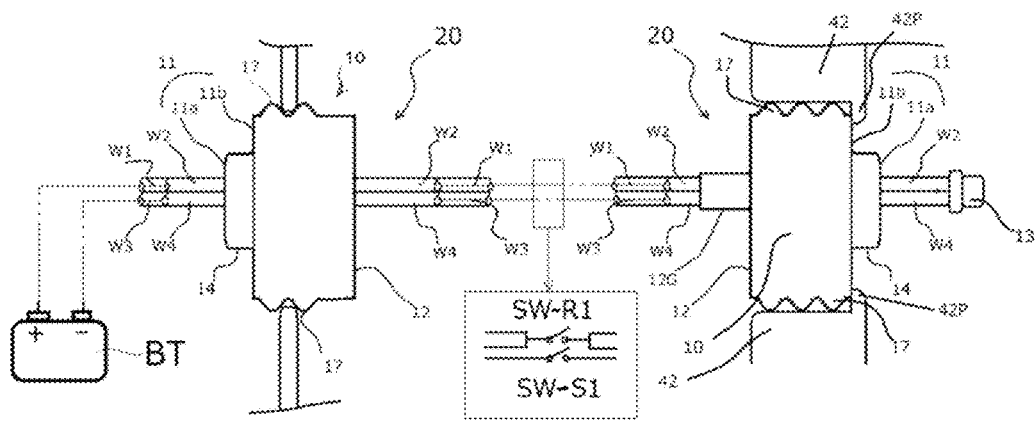

FIG. 4b is a schematic cross-sectional view showing another exemplary embodiment of a rear combination lamp, which is used as a rear combination lamp for a passenger vehicle of FIG. 4a, and which is attached to a rear right of the passenger vehicle. The vehicular signal lamp 40 is disclosed in Patent Document No. 4 (Japanese Patent Application Laid Open No. 2015-060,679) owned by this Applicant. Accordingly, only an essential point of the signal lamp 40 including a rear lamp and a stop lamp will now be described with reference to FIG. 4b The signal lamp 40 including a rear lamp and a stop lamp can include: an outer lens 43 made from a transparent resin; a casing 42 having an opening attaching the outer lens 43; a lamp room 44A and 44B located between the casing 42 and the outer lens 43; a signal lamp board 45 having a male coupler including light-emitting devices for the rear lamp and the stop lamp, the male coupler projecting toward the opening of the casing; a light guide 46 located between the outer lens 43 and the signal lamp board 45; and the wiring grommet 10 of the vehicular harness 20 attached into the opening of the casing 42 by only inserting the at least two outer convex surface 17 into the opening of the casing 42, while the second top surface 11b of the wiring grommet 10 contacts a projecting portion 42P of the casing 42 because the projecting portion 42P operates as a stopper.

In this case, the vehicular harness 20 can be provided with a female coupler 13 at an end of the vehicle harness 20, and the female coupler 13 of the vehicle harness 20 can be connected to the male coupler of the signal lamp board 45 including the light-emitting devices for the rear lamp and the stop lamp. The vehicular harness 20 can also be connected to the battery at another end of the vehicle harness 20. Therefore, when a driver turns on the rear lamp switch SW-R1, the signal lamp 40 can emit light emitted from the light-emitting device for the rear lamp via the light guide 46 as the rear lamp. Similarly, when the driver turns on the stop lamp switch SW-S1, the signal lamp 30 can also emit light emitted from the light-emitting device for the stop lamp via the light guide 46 as the stop lamp in common with the rear combination lamp 30 shown in FIG. 3a to FIG. 3d.

Figure 7C:
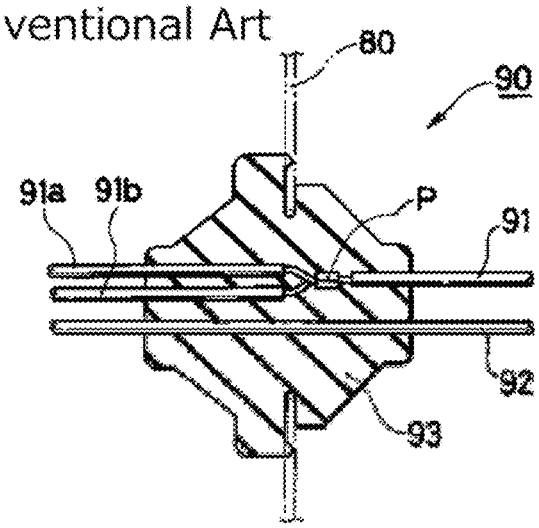

When the vehicular harness 20 is connected between a battery incorporated in an engine room of the passenger vehicle shown in FIG. 4a and the signal lamp 40, another wire grommet 10 can be attached to a wall, which is located between the engine room of the vehicle and a vehicle interior of the vehicle in common with the first conventional wiring grommet shown in FIG. 7c. In this case, the at least two outer convex surface 17 can be configured with only two outer convex surfaces 17. Additionally, when the vehicular harness 20 is used for the passenger vehicle, the wiring grommet 10 including the two outer convex surfaces 17 can be used for the vehicle harness 20 because the wiring grommet 10 including the two outer convex surfaces 17 is not always exposed to an external air.

Figure 5A:
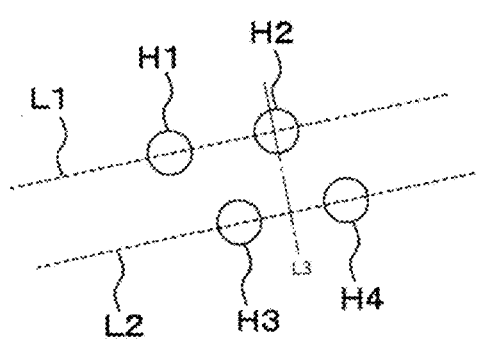
FIGS. 5a and 5b are explanatory partial views for explaining a first variation and a second variation of the wiring grommet shown in FIG. 1a, respectively.

Variations of the wiring grommet 10 will now be described with reference to FIG. 5a to FIG. 6. In the above-described embodiment of the wiring grommet 10, each of the plurality of through-holes H1, H2, H3 and H4, which is arranged in the substantially N-shaped fashion, is described. However, each of the plurality of through-holes H1, H2, H3 and H4 can be arranged as shown in FIG. 5a. Specifically, the third imaginary line L3 intersecting with the second center H2C of the second through-hole H2, which is located adjacent the third through-hole H3 and intersects with the first imaginary L1 at a right angle, can cross the second imaginary line L2 at a right angle between the third outer edge H3E of the third through-hole H3 and the fourth outer edge H4E of the fourth through-hole H4, if each of the thresholds TH1, TH2, TH3 and TH4 can meet conditions described above.

Figure 5B:
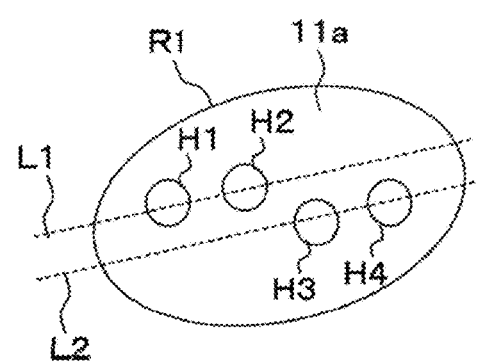

In addition, the first top outer edge R1 of the first top surface 11a, which is arranged in the substantially N-shaped fashion along the through-hole H including the plurality of through-holes H1, H2, H3 and H4, is described with reference to FIG. 2a. However, the first top outer edge R1 cannot be limited to the substantially N-shaped fashion, for example, can be formed in a substantially elliptical shape and the like as shown in FIG. 5b, if each of the thresholds TH1, TH2, TH3 and TH4 can meet the conditions described above.

Figure 6:
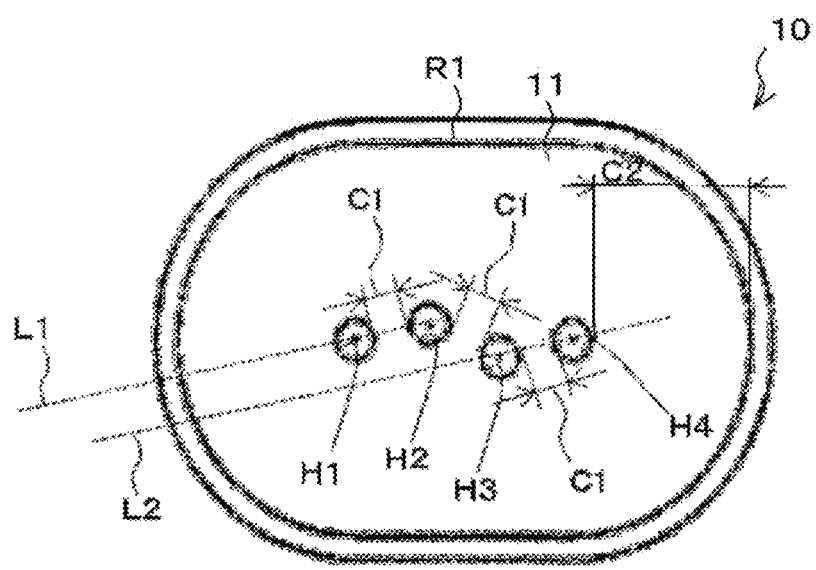
FIG. 6 is an explanatory partial view for explaining a third variation of the wiring grommet shown in FIG. 1.

Moreover, as described above, the first top surface 11a and the second top surface of the top surface 11 can also be substantially the same surface by forming the first side thickness ST1 at 0 millimeters as shown FIG. 6 if each of the thresholds TH1, TH2 and TH3 can meet the conditions described above.

According to the exemplary wiring grommets having a broad utility and a high reliability, the exemplary vehicular harnesses can incorporate various wiring grommets to electrically connect between a battery and vehicle lamps such as a headlight, a signal lamp, etc. Thus, the disclosed subject matter can provide the wiring grommets having a broad utility and a high reliability with respect to a waterproof property and the like, and also can provide the vehicular harnesses using the wiring grommet, which can be used for vehicle lamps such as a stop lamp, a tail lamp and the like, even when the wiring grommet is exposed to an external air.

Various modifications of the above disclosed embodiments can be made without departing from the spirit and scope of the presently disclosed subject matter. For example, cases where wire code AV0.5 having outside diameter of standard 2.2 millimeters or wire code AV0.5f having outside diameter of standard 2.2 millimeters in JIS is used as each of the wires W1, W2, W3 and W4 are described. However, the wiring grommets 10 is not limited to this wire and can be formed in various wires such as wire code AVSS0.5 having outside diameter of standard 1.6 millimeters, wire code AVSS0.85 having outside diameter of standard 1.8 millimeters and wire code AVSS1.25 having outside diameter of standard 2.1 millimeters in JASO D611. In addition, the specific arrangement between components can vary between different applications, and several of the above-described features can be used interchangeably between various embodiments depending on a particular application of the grommet.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entireties by reference.

What is claimed is:

1. A wiring grommet made from a rubber, the wiring grommet comprising:
   a top surface having a first top surface and a second top surface, the first top surface having a first top outer edge formed in a substantially planar shape, the second top surface having a second top outer edge and a second top inner edge formed in a substantially planar shape, and located in substantially parallel with the first top surface;
   a first side surface having a first side thickness located between the first top surface and the second top surface of the top surface;
   a rear surface formed in a substantially planar shape, and located in an opposite direction of the top surface;
   at least two outer convex surface having a second side thickness located between the second top surface of the top surface and the rear surface, formed in a substantially ring shape, and located in substantially parallel with the second top surface, wherein the second side thickness is thicker than the first side thickness of the first side surface;
   a through-hole having a plurality of through-holes passing between the first top surface of the top surface and the rear surface in a direction of the first side thickness and the second side thickness, each of the plurality of through-holes having a center and an inside diameter, and having an inner surface and an outer edge formed in a substantially circle at the center, each of the inner surfaces having a plurality of inner concave surfaces formed in a substantially ring shape at the center, each of the inner concave surfaces having a convex top diameter narrowed from the inner surface toward the center, and each of the convex top diameters formed in a substantially circle at the center; and
   wherein a first minimum thickness in intervals between adjacent through-holes of the through-holes is thicker than a first threshold, a second minimum thickness in second thicknesses between each of the outer edges and the first top outer edge of the first top surface is thicker than a second threshold, a third minimum thickness in third thicknesses between the second top outer edge and the second top inner edge of the second top surface is thicker than a third threshold, and the first side thickness of the first side surface is thinner than a fourth threshold.

2. A wiring grommet made from a rubber, the wiring grommet comprising:
   a top surface having a first top outer edge formed in a substantially planar shape;
   a rear surface formed in a substantially planar shape, and located in an opposite direction of the top surface;
   at least two outer convex surface having a second side thickness located between the top surface and the rear surface, formed in a substantially ring shape, and located in substantially parallel with the top surface;
   a through-hole having a plurality of through-holes passing between the top surface and the rear surface, each of the plurality of through-holes having a center and an inside diameter, and having an inner surface and an outer edge formed in a substantially circle at the center, each of the inner surfaces having a plurality of inner concave surfaces formed in a substantially ring shape at the center, each of the inner concave surfaces having a convex top diameter narrowed from the inner surface toward the center, and each of the convex top diameters formed in a substantially circle at the center; and
   wherein a first minimum thickness in intervals between adjacent through-holes of the through-holes is thicker than a first threshold, and a second minimum thickness in second thicknesses between each of the outer edges and the first top outer edge of the top surface is thicker than a second threshold.

3. A wiring grommet made from a rubber, the wiring grommet comprising:
   a top surface and a rear surface located in an opposite direction of the top surface, each of the top surface and the rear surface formed in a nearly circular shape including an outer circumference having a first diameter and a second diameter being less than the first diameter, and surrounded by the outer circumference, the top surface having a first top surface and a second top surface, the first top surface having a first top outer edge formed in a substantially planar shape, the second top surface having a second top outer edge and a second top inner edge formed in a substantially planar shape, and located in substantially parallel with the first top surface;
   a first side surface having a first side thickness located between the first top surface and the second top surface of the top surface;

four through holes passing between the top surface and the rear surface, and each of the four through holes arranged side by side in line along a direction of each of the first diameters and the second diameters of the top surface and the rear surface; and wherein the through holes are configured to be a first through-hole, a second through-hole, a third through-hole and a fourth through-hole, the first through-hole is located adjacent to the second through-hole, the second through-hole is located adjacent to the third through-hole, and the third through-hole is located adjacent to the fourth through-hole, and wherein each of centers of the first through-hole and the second through-hole is arranged on a first imaginary line, each of centers of the third through-hole and the fourth through-hole is arranged on a second imaginary line, and each of the first imaginary line and the second imaginary line is separately located in substantially parallel with each other, and wherein a first minimum thickness in intervals between the adjacent through-holes of the four through holes is thicker than a first threshold, a second minimum thickness in second thicknesses between each of the outer edges of the four through holes and the first top outer edge of the first top surface is thicker than a second threshold, and the second threshold is thicker than the first threshold.

4. The wiring grommet made from rubber according to claim 3, wherein the second threshold is 2.0 millimeters or more, and a fourth threshold is 2.0 millimeters or less.

5. The wiring grommet made from rubber according to claim 4, wherein a third threshold is 2.6 millimeters or more.

6. The wiring grommet made from rubber according to claim 3, wherein each of inner surfaces having a plurality of inner convex surfaces of the four through holes is formed in a substantially ring shape at the center.

7. A vehicular harness using the wiring grommet according to claim 6, comprising:
a wire inserted into each of the four through-holes.

8. A wiring grommet made from a rubber, the wiring grommet comprising:
a top surface and a rear surface located in an opposite direction of the top surface, each of the top surface and the rear surface formed in a nearly circular shape including an outer circumference having a first diameter and a second diameter being less than the first diameter, and surrounded by the outer circumference, the top surface having a first top outer edge formed in a substantially planar shape, the rear surface formed in a substantially planar shape, and located in an opposite direction of the top surface;

four through holes passing between the top surface and the rear surface, and each of the four through holes arranged side by side in line along a direction of each of the first diameters and the second diameters of the top surface and the rear surface; and wherein the through holes are configured to be a first through-hole, a second through-hole, a third through-hole and a fourth through-hole, the first through-hole is located adjacent to the second through-hole, the second through-hole is located adjacent to the third through-hole, and the third through-hole is located adjacent to the fourth through-hole, and wherein each of centers of the first through-hole and the second through-hole is arranged on a first imaginary line, each of centers of the third through-hole and the fourth through-hole is arranged on a second imaginary line, and each of the first imaginary line and the second imaginary line is separately located in substantially parallel with each other, and wherein a first minimum thickness in intervals between the adjacent through-holes of the four through holes is thicker than a first threshold, a second minimum thickness in second thicknesses between each outer edge of the four through holes and the first top outer edge of the first top surface is thicker than a second threshold, and the second threshold is thicker than the first threshold.

9. The wiring grommet made from rubber according to claim 8, wherein the second threshold is 2.0 millimeters or more.

10. The wiring grommet made from rubber according to claim 9, wherein a third threshold is 2.6 millimeters or more.

11. The wiring grommet made from rubber according to claim 8, wherein each of inner surfaces having a plurality of inner convex surfaces of the four through holes is formed in a substantially ring shape at the center.

12. A vehicular harness using the wiring grommet according to claim 11, comprising:
a wire is inserted into each of the four through-holes.

* * * * *